J. M. WALKER.
CONTROLLABLE HEADLIGHT.
APPLICATION FILED JAN. 17, 1914.

1,127,327.

Patented Feb. 2, 1915.
2 SHEETS—SHEET 1.

Witnesses:
Christ Feinle, Jr.
U. B. Hillyard.

Inventor,
J. M. Walker.
By Victor J. Evans,
Attorney.

J. M. WALKER.
CONTROLLABLE HEADLIGHT.
APPLICATION FILED JAN. 17, 1914.
1,127,327.
Patented Feb. 2, 1915.
2 SHEETS—SHEET 2.
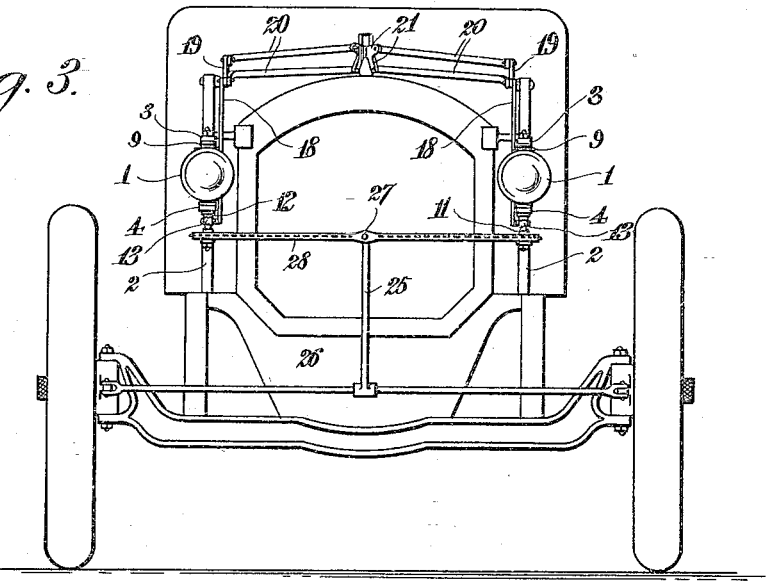
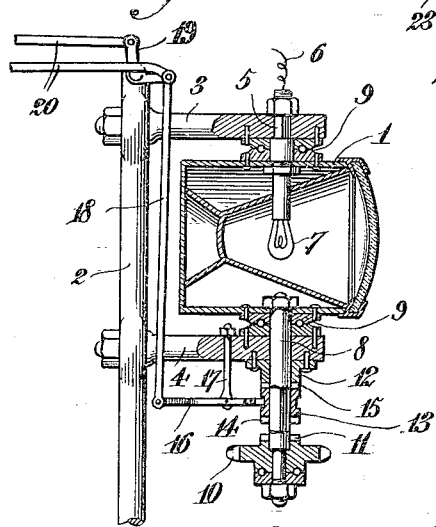
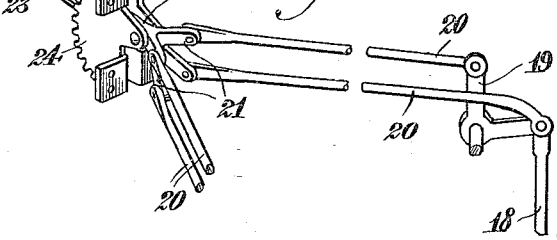
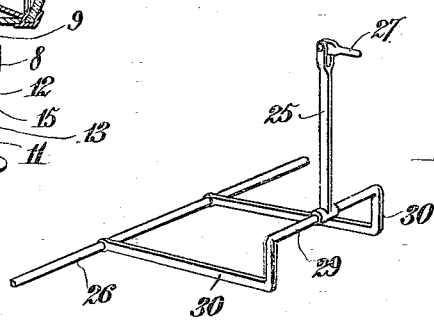
Witnesses:
Christ Feinle, Jr.
U. B. Hillyard.
Inventor,
J. M. Walker.
By Victor J. Evans,
Attorney.

UNITED STATES PATENT OFFICE.

JOHN M. WALKER, OF ROCK CREEK, BRITISH COLUMBIA, CANADA.

CONTROLLABLE HEADLIGHT.

1,127,327. Specification of Letters Patent. Patented Feb. 2, 1915.

Application filed January 17, 1914. Serial No. 812,807.

*To all whom it may concern:*

Be it known that I, JOHN M. WALKER, a citizen of Canada, residing at Rock Creek, in the Province of British Columbia and Dominion of Canada, have invented new and useful Improvements in Controllable Headlights, of which the following is a specification.

The invention provides a headlight for motor vehicles generally and for automobiles in particular which will enable the roadway ahead of the vehicle or machine to be illuminated when traveling straight ahead, turning a corner or rounding a curve, thereby adding largely to the safety of the public as well as the occupants of the vehicle.

The invention provides a headlight which is automatically moved by the steering mechanism so that when the steering wheels are turned the light is correspondingly moved to throw the rays in advance of the machine. Novel means are provided to admit of throwing the headlight into or out of engagement with the steering mechanism so that when required the lamps may be held stationary this being of advantage when operating the machine during the day or at such times when the headlight is not required for use.

The invention consists of the novel features, details of construction and combination of parts, which hereinafter will be more particularly set forth, illustrated in the accompanying drawings, and pointed out in the appended claims.

Figure 1:
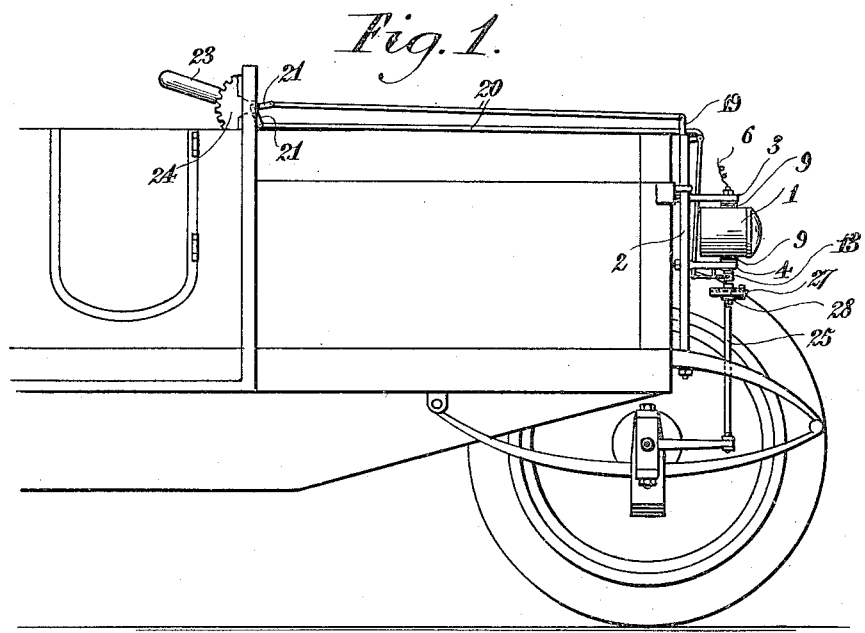
Figure 2:
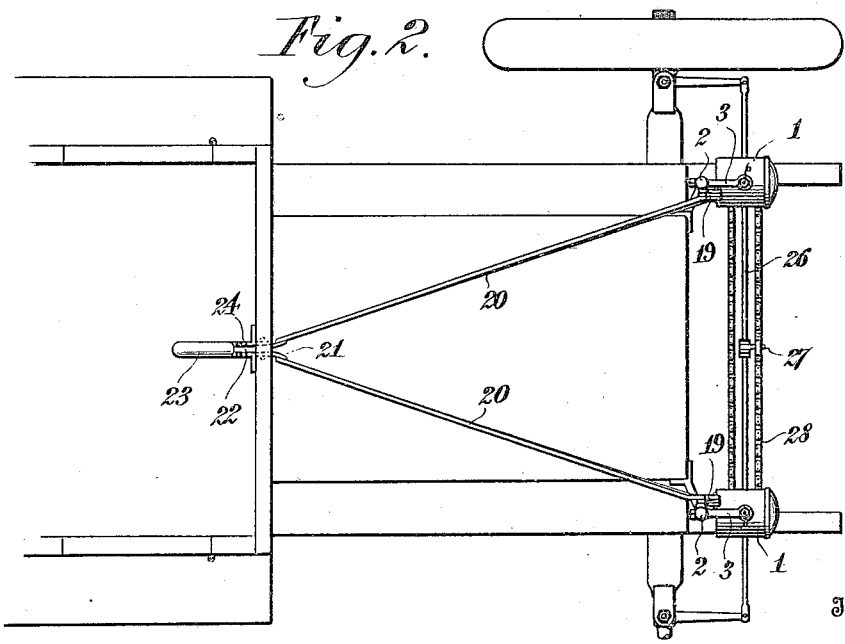

Referring to the drawings, forming a part of the specification, Figure 1 is a side view of the forward portion of an automobile provided with a headlight embodying the invention. Fig. 2 is a top plan view. Fig. 3 is a front view. Fig. 4 is a sectional detail of a lamp support and adjunctive parts. Fig. 5 is a detail perspective view of the lamp connections and operating means. Fig. 6 is a detail perspective view of a modification.

Corresponding and like parts are referred to in the following description and indicated in all the views of the drawings, by the same reference characters.

The headlight is of the variety embodying side lamps 1. Each of the lamp supports comprises a standard 2 and upper and lower arms 3 and 4, the standard 2 being secured at its lower end to the frame of the machine or vehicle in any way. A journal 5 is secured in the upper arm 3 and is tubular to admit of electric wires 6 passing therethrough for conveying the electric fluid to the lamp 7 which is attached to the lower end of the journal 5. A journal 8 is mounted in the lower arm 4 so as to turn and is in line with the journal 5. The lamp 1 is secured to the journal 8 so as to turn therewith and is mounted on the journal 5 to turn thereon. Ball bearings 9 are interposed between the lamp 1 and journals to admit of the lamp turning freely and with a minimum resistance. A sprocket wheel is loose upon the lower end of the journal 8 and is provided with a half clutch. A half clutch 12 is secured to the underside of the arm 4. A sleeve 13 is mounted upon the lower portion of the journal 8 to turn therewith but is free to move thereon. The sleeve 13 is provided at its lower end with a half clutch 14 to engage with the half clutch 10 of the journal 8 to cause the sleeve and journal to turn together. A half clutch 15 is formed at the upper end of the sleeve 13 and is adapted to coöperate with the half clutch 12 to prevent turning of the journal and lamp when the latter is required to be held stationary. A shipper lever 16 is fulcrumed between its ends to a post 17 pendent from the arm 4. One end of the shipper lever 16 has engagement with the sleeve 13 to admit of moving such sleeve to throw it into clutched engagement with either one of the parts 12 or 11 accordingly as it is required to hold the lamp stationary or to connect the same with the steering mechanism for movement therewith. A rod 18 connects the opposite end of the shipper lever 16 with one arm of a bell crank 19 pivoted to the upper end of the standard 2, such bell crank having both of its arms connected by means of rods 20 with fingers 21 of a lever 22 fulcrumed upon the dash or other part of the vehicle within convenient reach of the operator. The lever 22 is provided with a spring actuated hand piece 23 which is formed with teeth to engage toothed segments 24 to hold the lever 22 and attached parts in the required position. The lever 22 is preferably located at a central point and pairs of fingers 21 branch therefrom, the rods 20 provided for each of the lamps being connected to the fingers of a pair. The construction is such as to admit of both sleeves 13 being operated simultaneously to throw both lamps into or out of engagement with the steering mechanism or to lock the same when it is required to fix the position of the lamp.

An arm 25 is connected with the drag link 26 and is provided at its upper end with a pivoted finger 27 which is adapted to engage a link or eye of a sprocket chain 28 which connects the sprocket wheels 10. The drag link 26 connects the arms of the steering knuckles to cause both steering wheels to move in unison, the pivoted finger 27 makes provision for the relative change of position of the drag link when the same is operated. The finger 27 engaging a link or eye of the sprocket chain provides for the up and down movement of the framework of the machine incident to the action of the vehicle springs. Movement of the drag link or connecting rod 26 to the right or to the left causes a corresponding movement of the sprocket chain 28 and the sprocket wheels 10 are caused to turn either to the right or to the left. When the clutch sleeves 13 are moved to bring them in clutched engagement with the sprocket wheels 10 both lamps turn together when the steering mechanism is operated. When the sleeves 13 are moved into clutched engagement with the clutch members 12 both lamps are held stationary.

In the modification shown in Fig. 6 the arm 25 is attached to a rod or bar 29 which in turn is connected by means of brackets 30 with the drag link or connecting rod 26. This construction is necessary when the drag link or connecting rod 26 is located in the rear of the axle so that the arm 25 may extend upwardly in front of the radiator.

When a vehicle or machine is equipped with a headlight embodying the invention and it is required to have the lamps move with the steering mechanism the lever 22 is moved to throw the clutch members or sleeves 13 into clutched engagement with the sprocket wheels 10, hence when the steering mechanism is operated the lamps are correspondingly moved. When it is required to disconnect the lamps from the steering mechanism and hold such lamps stationary the lever 22 is moved to throw the clutch members 13 into clutched engagement with the members 12.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a headlight, the combination of a standard, upper and lower arms projecting from such standard, a journal fixed in the upper arm, a second journal rotatable in the lower arm, a lamp body rotatable on the upper journal and secured to the lower journal to turn therewith, a lamp attached to the lower end of the upper journal and means for turning the lower journal to move the lamp body about the upper journal and the lamp carried by such journal.

2. In combination, side lamps, supports therefor, journals projecting from the lamps and mounted in the lamp supports, connecting means between the lamps and the steering mechanism of the vehicle provided with the lamps, movable clutch members adapted to coöperate with complemental clutch members either for holding the lamps stationary or connecting them with the lamp operating means, levers having connection with the movable clutch members, bell cranks connected with such levers, an operating lever located within convenient reach of the driver and provided with pairs of fingers and rods connecting the pairs of fingers with the arms of the bell cranks.

In testimony whereof I affix my signature in presence of two witnesses.

JOHN M. WALKER.

Witnesses:
 EDWARD PITTENDRIGH,
 HENRY NICHOLSON.

Copies of this patent may be obtained for five cents each, by addressing the "Commissioner of Patents, Washington, D. C."